United States Patent
Mu et al.

(10) Patent No.: US 10,812,974 B2
(45) Date of Patent: Oct. 20, 2020

(54) VIRTUAL DESKTOP CLIENT CONNECTION CONTINUITY

(71) Applicant: VMware, Inc., Palo Alto, CA (US)

(72) Inventors: Jian Mu, Beijing (CN); YiQun Yun, Beijing (CN); Yuping Wei, Beijing (CN); Gang Si, Beijing (CN); Ming Zhao, Beijing (CN)

(73) Assignee: VMware, Inc., Palo Alto, CA (US)

( * ) Notice: Subject to any disclaimer, the term of this patent is extended or adjusted under 35 U.S.C. 154(b) by 549 days.

(21) Appl. No.: 15/588,639

(22) Filed: May 6, 2017

(65) Prior Publication Data

US 2018/0324156 A1 Nov. 8, 2018

(51) Int. Cl.
*H04W 4/00* (2018.01)
*H04W 12/04* (2009.01)
(Continued)

(52) U.S. Cl.
CPC ....... *H04W 12/0401* (2019.01); *H04L 9/0838* (2013.01); *H04L 63/0435* (2013.01);
(Continued)

(58) Field of Classification Search
CPC . H04L 63/0435; H04L 63/061; H04L 67/141; H04L 67/42; H04L 2209/80;
(Continued)

(56) References Cited

U.S. PATENT DOCUMENTS 6,049,878 A * 4/2000 Caronni ............... H04L 9/0836
380/277
7,620,017 B2 * 11/2009 Sayeedi ............... H04W 36/12
370/328
(Continued)

FOREIGN PATENT DOCUMENTS

SG 102017010445 * 2/2017
WO WO-2018147800 A1 * 8/2018 ........... H04L 9/3263

OTHER PUBLICATIONS

Tounsi, Wiem. "Security and privacy controls in rfid systems applied to EPCglobal networks." PhD diss., Télécom Bretagne; Université de Rennes 1, 2014. (Year: 2014).*
(Continued)

*Primary Examiner* — Luu T Pham
*Assistant Examiner* — Walter J Malinowski

(57) ABSTRACT

Techniques are described for enabling a client device having an established virtual desktop session to seamlessly handoff the virtual desktop session to other nearby client devices without the need for the user to manually disconnect the client and re-enter authentication information. The session transfer may be performed using a short-range wireless connectivity protocol, such as BTLE, where the client device having an established virtual desktop session operates in sender mode and broadcasts session handoff messages to nearby receiver devices within a valid range. Another client device operating in receiver mode may accept the session handoff message including session information associated with the virtual desktop session and initiate the transfer of the virtual desktop session without the need for the user to re-authenticate to the server.

14 Claims, 5 Drawing Sheets

(51) Int. Cl.
  *H04L 29/06* (2006.01)
  *H04L 29/08* (2006.01)
  *H04W 4/80* (2018.01)
  *H04L 9/08* (2006.01)
  *H04W 12/00* (2009.01)

(52) U.S. Cl.
  CPC ............ *H04L 63/061* (2013.01); *H04L 67/08* (2013.01); *H04L 67/141* (2013.01); *H04L 67/148* (2013.01); *H04L 67/42* (2013.01); *H04W 4/80* (2018.02); *H04W 12/0013* (2019.01); *H04W 12/04071* (2019.01); *H04L 2209/80* (2013.01)

(58) Field of Classification Search
  CPC . H04L 67/4208; H04L 67/148; H04L 9/0838; H04W 4/80; H04W 12/04071; H04W 12/0013; H04W 12/0401
  USPC ........................................................ 713/168
  See application file for complete search history.

(56) References Cited

U.S. PATENT DOCUMENTS

| | | | |
|---|---|---|---|
| 8,800,007 B1* | 8/2014 | Rajagopalan ....... H04L 63/0272 380/27 |
| 9,396,016 B1* | 7/2016 | Marquardt .......... G06F 9/45558 |
| 10,110,569 B1* | 10/2018 | Coelho ................ H04L 67/06 |
| 10,257,495 B1* | 4/2019 | Poder .................... G06F 21/36 |
| 10,318,320 B1* | 6/2019 | Thomas .............. G06F 9/45558 |
| 2002/0178187 A1* | 11/2002 | Rasmussen ........... G06F 17/243 715/234 |
| 2004/0243349 A1* | 12/2004 | Greifeneder .......... H04L 63/166 702/183 |
| 2007/0036353 A1* | 2/2007 | Reznik ................. H04B 7/0434 380/30 |
| 2007/0174614 A1* | 7/2007 | Duane .................... G06F 21/31 713/168 |
| 2008/0049759 A1* | 2/2008 | Godavarti ............... H04L 69/40 370/395.5 |
| 2009/0006851 A1* | 1/2009 | Freeman ............. H04L 63/0442 713/170 |
| 2009/0106551 A1* | 4/2009 | Boren ................... H04L 9/0822 713/158 |
| 2010/0042684 A1* | 2/2010 | Broms ................... G06F 3/0483 709/204 |
| 2012/0297466 A1* | 11/2012 | Li ........................... G06F 21/10 726/7 |
| 2012/0331536 A1* | 12/2012 | Chabbewal ............. G06F 21/33 726/7 |
| 2013/0103590 A1* | 4/2013 | Johansson .......... G06Q 20/3229 705/44 |
| 2013/0326639 A1* | 12/2013 | Droste .................... G06F 21/55 726/28 |
| 2013/0346494 A1* | 12/2013 | Nakfour .............. H04L 67/1095 709/204 |
| 2014/0115028 A1* | 4/2014 | Taylor .................. H04L 67/141 709/202 |
| 2014/0115175 A1* | 4/2014 | Lublin .................. G06F 9/4856 709/228 |
| 2014/0267328 A1* | 9/2014 | Banack ..................... G06T 1/20 345/522 |
| 2014/0304779 A1* | 10/2014 | Lee ......................... H04L 63/10 726/4 |
| 2015/0006880 A1* | 1/2015 | Alculumbre ........ H04L 63/0435 713/153 |
| 2015/0143419 A1* | 5/2015 | Bhagwat ............ H04N 21/2265 725/37 |
| 2015/0249647 A1* | 9/2015 | Mityagin .............. G06F 16/178 713/168 |
| 2015/0304433 A1* | 10/2015 | Xiao ...................... H04L 67/148 709/203 |
| 2016/0036963 A1* | 2/2016 | Lee ........................... G06F 8/61 455/418 |
| 2016/0057123 A1* | 2/2016 | Jiang ...................... H04L 67/08 726/7 |
| 2016/0315772 A1* | 10/2016 | McCallum ............ H04L 9/3213 |
| 2016/0344798 A1* | 11/2016 | Kapila .................... H04L 67/10 |
| 2017/0099268 A1* | 4/2017 | Camenisch ......... H04L 63/0435 |
| 2017/0149853 A1* | 5/2017 | Furuichi ............. G06F 9/45558 |
| 2017/0257907 A1* | 9/2017 | Yu ......................... H04W 8/005 |
| 2017/0308665 A1* | 10/2017 | Heck ................. A61M 5/14244 |
| 2017/0310790 A1* | 10/2017 | Vajravel ................ H04L 67/141 |
| 2018/0098338 A1* | 4/2018 | Choi ........................ H04W 4/00 |
| 2018/0183596 A1* | 6/2018 | Deshpande ......... H04L 63/0442 |
| 2018/0183881 A1* | 6/2018 | Lewis ..................... H04L 67/22 |
| 2018/0213447 A1* | 7/2018 | Hiramatsu ............ H04W 36/32 |
| 2018/0278414 A1* | 9/2018 | Van k ..................... H04L 9/085 |
| 2019/0141584 A1* | 5/2019 | Ben Henda ........... H04W 12/04 |
| 2019/0261168 A1* | 8/2019 | Shi .................... H04W 12/0013 |
| 2019/0372763 A1* | 12/2019 | Yang ..................... H04L 9/0869 |

OTHER PUBLICATIONS

Chakraborti, Asit, Aytac Azgin, Ravishankar Ravindran, and Guoqiang Wang. "Seamless Mobility as a Service on ICN." In Proceedings of the 3rd ACM Conference on Information-Centric Networking, pp. 229-230. ACM, 2016. (Year: 2016).*
Park, Jaesung. "Secure handoff method for seamless service provisioning in infrastructure mode 802.11 i system." In The International Conference on Information Networking 2013 (ICOIN), pp. 664-669. IEEE, 2013. (Year: 2013).*
Lee, Chunghan, Tatsuo Kumano, Tatsuma Matsuki, Hiroshi Endo, Naoto Fukumoto, and Mariko Sugawara. "Understanding storage traffic characteristics on enterprise virtual desktop infrastructure." In Proceedings of the 10th ACM International Systems and Storage Conference, pp. 1-11. 2017. (Year: 2017).*
Sun, Xiang, and Nirwan Ansari. "Avaptive avatar handoff in the cloudlet network." IEEE Transactions on Cloud Computing (2017). (Year: 2017).*
NSUserActivity Class reference https://developer.apple.com/library/ios/documentation/Foundation/Reference/NSUserActivity_Class/ (retrieved on May 2, 2017).
System requirements for Continuity on Apple devices https://support.apple.com/en-us/HT204689 (retrieved on May 2, 2017).
Bluetooth LE 4.0 https://www.bluetooth.com/what-is-bluetooth-technology/bluetooth-technology-basics/low-energy (retrieved on May 2, 2017).
J-PAKE: Authenticated Key Exchange Without PKI, Feng Hao and Peter Ryan, 2010 https://eprint.iacr.org/2010/190.pdf (retrieved on May 2, 2017).
Android BTLE API http://developer.android.com/guide/topics/connectivity/bluetooth-le.html (retrieved on May 2, 2017).
Window Bluetooth Driver Stack https://msdn.microsoft.com/en-us/library/windows/hardware/ff536853(v=vs.85).aspx (retrieved on May 2, 2017).
Core Bluetooth Programming Guide https://developer.apple.com/library/ios/documentation/NetworkingInternetWeb/Conceptual/CoreBluetooth_concepts/AboutCoreBluetooth/Introduction.html (retrieved on May 2, 2017).

* cited by examiner

VIRTUAL DESKTOP CLIENT CONNECTION CONTINUITY

TECHNICAL FIELD

The present disclosure generally relates to virtual desktops and more specifically to techniques for providing continuity of a virtual desktop session between different client devices.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access their virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

One of the advantages offered by virtual desktops is the ability of the user to use many different types of devices to log into the desktop. For example, a user may use their tablet computing device to access their virtual desktop while on the go and then use a laptop or personal computer (PC) to log into their virtual desktop once they get home. However, in order to restrict access to the virtual desktop, the user must typically disconnect one device and then re-enter authentication information such as a user name and password before they can log into the virtual desktop on a different device. This process is often clumsy and time-consuming.

DETAILED DESCRIPTION

Figure 1:
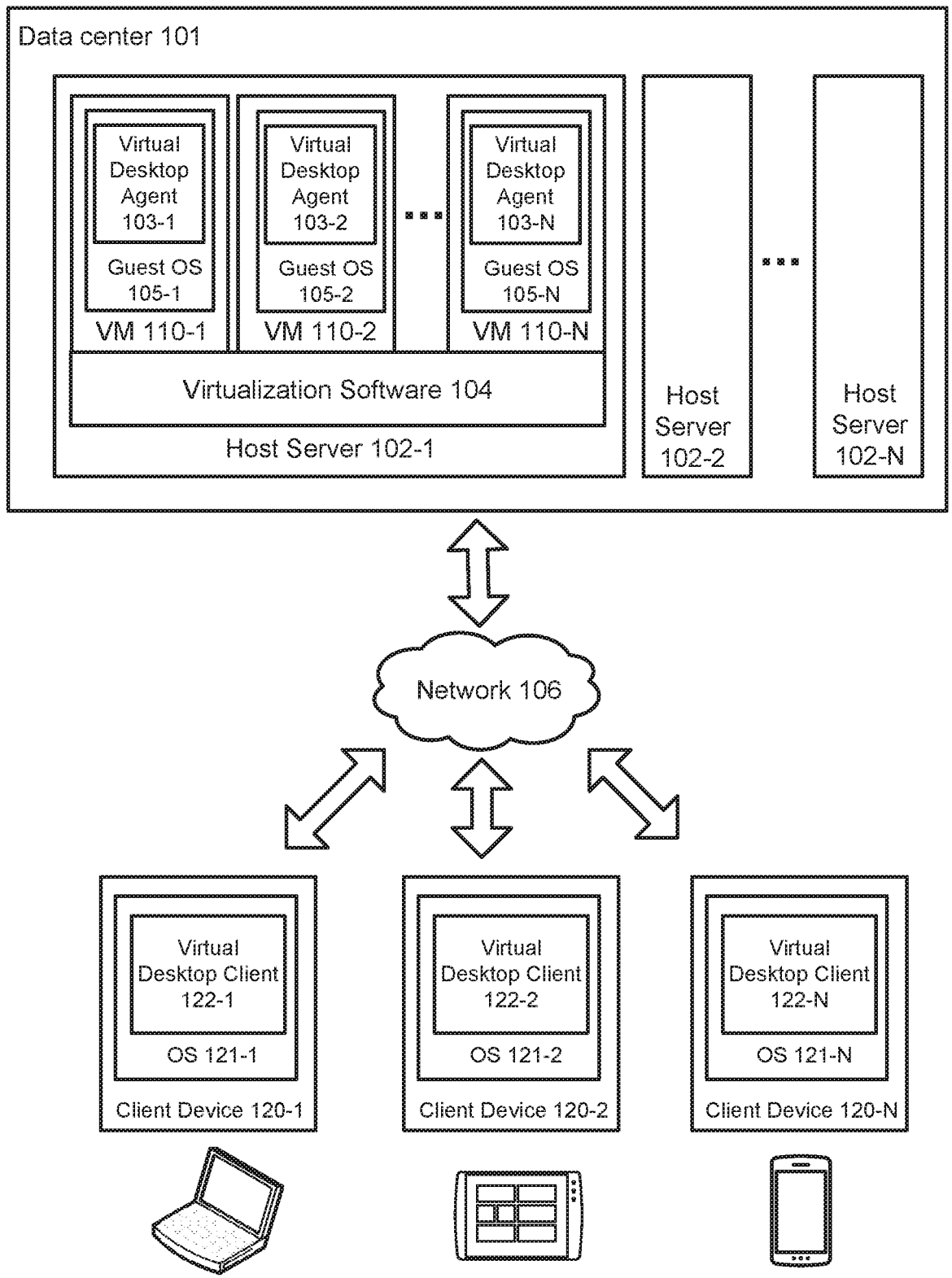
FIG. 1 illustrates an example of a virtual desktop environment, in accordance with various embodiments.

Systems and methods in accordance with various embodiments of the present disclosure overcome at least some of the above-mentioned shortcomings and deficiencies by enabling virtual desktop client connection continuity. In particular, embodiments described herein enable a client device having an established virtual desktop session to seamlessly handoff the virtual desktop session to other nearby client devices without the need for the user to manually disconnect the client and re-enter authentication information.

When a client device first establishes a virtual desktop session with a virtual desktop operating on a remote server (upon successful authentication of the user's credentials), the client receives session information including a session identifier from the server. The session information is saved in a client cookie stored in memory of the client device and is used to maintain the connection with the server. Conventionally, any time the client disconnects, restarts or initiates a new connection with the server, the cookie containing the session information is deleted and the user would need to re-enter the user credentials, such as a user name and password in order to re-authenticate to the virtual desktop. This is done for security purposes so as to prevent malicious users or programs from gaining access to the user's virtual desktop In order to implement the session handoff feature described herein, when one client device establishes the virtual desktop session with the server, the client device assumes a "sender" role and begins broadcasting session handoff messages to nearby client devices using a short-range communications method, such as the Bluetooth Low Energy (BTLE) protocol. The session handoff messages are broadcast to any client device within a valid distance defined by the short-range communications protocol (e.g., max distance of 100 meters). The session handoff message contains information used to transfer the virtual desktop from the sender client device to a receiver client device that accepts the session handoff message. For example, the session handoff message may contain the virtual desktop session identifier (e.g. JSESSION ID), the address of the server hosting the virtual desktop and the identifier of the virtual desktop (in the event the user is entitled to access more than one virtual desktop on the server). In one embodiment, the session handoff message may be encapsulated in an "NSUserActivity" object as available in the iOS and MAC OSX operating systems. In another embodiment, the session handoff message may be a generic data structure containing a key-value table to store the information.

Nearby devices having a virtual desktop client application installed thereon may be operating in "receiver" mode wherein the receiver devices are scanning for messages transmitted by sender devices. In one embodiment, after the receiver device receives the session handoff message, it displays a notification to the user of the receiver device that a virtual desktop session is available for transfer from a nearby device and provides an option for the user to accept the session handoff message. If the user provides input accepting the transfer, the session handoff process is initiated to log the receiver client device into the virtual desktop using the session information received as part of the session handoff message from the sender client device. The session handoff transfer is performed seamlessly and transparently with respect to the user, without requesting the user to re-enter any authentication information for the virtual desktop.

As used throughout this disclosure, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
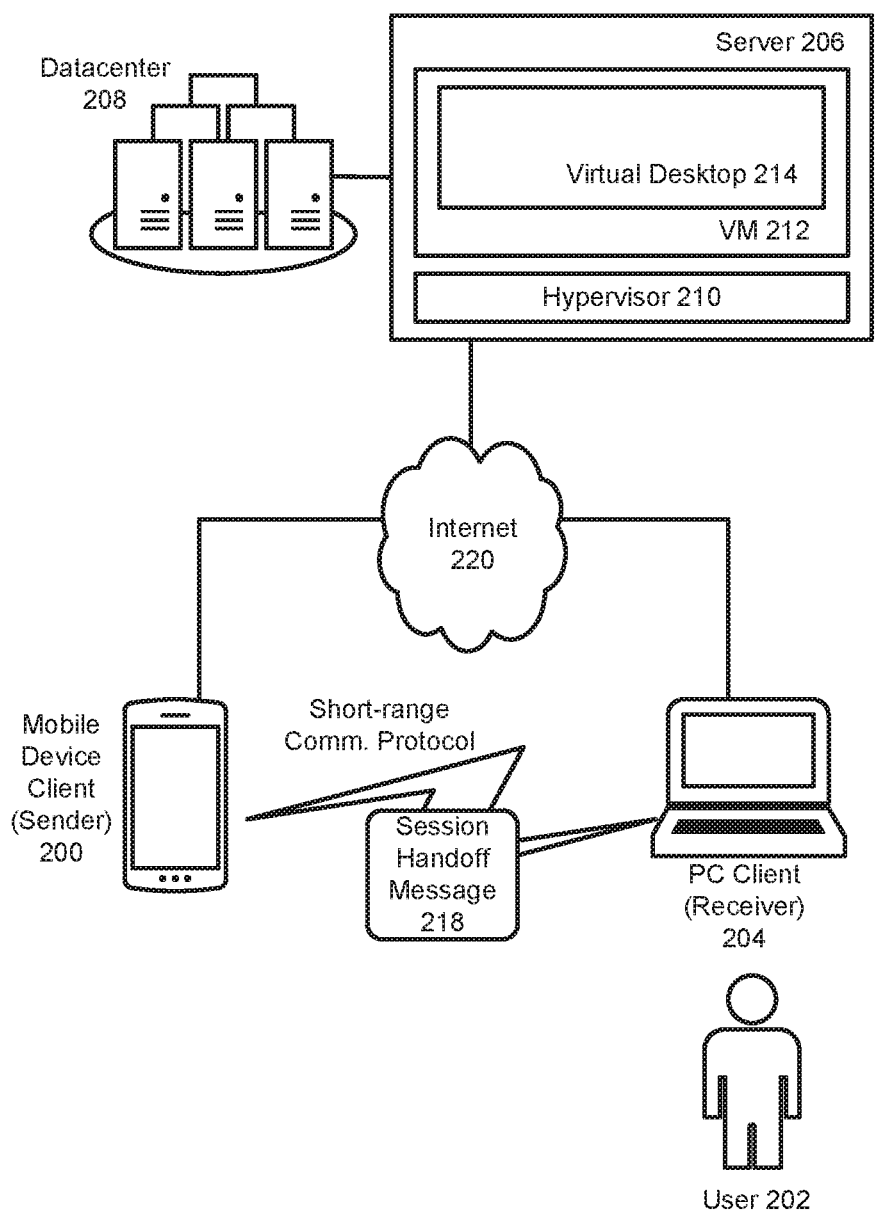
FIG. 2 illustrates an example of virtual desktop connection continuity, in accordance with various embodiments.

FIG. 2 illustrates an example of virtual desktop connection continuity, in accordance with various embodiments. As previously described, the virtual desktop 214 is typically hosted on a server 206 that resides in a data center 208, located remotely from the various client devices that may access the virtual desktop 214. The virtual desktop 214 is typically executed on a virtual machine 212 and is accessed by the client devices over an Internet connection 220. Each client device (200, 204) has a virtual desktop client application installed thereon, which enables the client device to establish virtual desktop sessions on the server 206.

When a user launches a virtual desktop session on a client device, such as client 200, the user must first provide a set of credentials such as a user name and password combination. The client device 200 can then be authenticated and the virtual desktop session is established for the client device 200. A session information object (e.g. NSUserActivity object) is created on the client device 200 associated with the specified activity type and user information of the server's name, remote desktop's name, and other necessary data related to the desktop session.

Once the session is established, the client device 200 begins operating in "sender" mode. In this mode, the session information object is broadcasted through a common interface, which sends the handoff message 218 to the nearby devices over a short-range communication protocol, such as Bluetooth Low Energy (BTLE) or near field communication (NFC). BTLE defines the theoretical maximum distance between devices to be 100 meters so it may be particularly useful for the transfer of virtual desktop sessions. Client applications, which have integrated the session handoff feature, operating on client devices in "receiver" mode are able to receive the broadcasted session handoff messages from client device 200. In one embodiment, an eligible receiver should either have the same user account logged in (e.g. same iCloud account under iOS and OSX) or share a trusted key of the original device (e.g. Android, iOS, Windows, OS X) to receive the handoff message 218.

When a receiver device 204 receives the session handoff message from a nearby sender device 200, there can be an indicator displayed to notify the end user 202 of the ability to accept the session handoff request. Once the user 202 confirms the notification, the handoff request is considered as accepted. The desktop session will be resumed on the receiver device 204 without the need of the user to re-enter the authentication information (user name and password). The desktop session on original client device 200 is disconnected automatically. This provides a more seamless transition between the two devices from the user's perspective.

Sender Device

As mentioned above, once the client device 200 establishes a virtual desktop session with the server 206, it begins operating as a sender to broadcast a session handoff message 218 containing the data necessary to transfer the virtual desktop session. The session handoff message 218 can be transmitted using a short-range communication protocol, such as BTLE. In various embodiments, the message 218 may be broadcasted by the sender device periodically or the receiver device may alternatively scan for nearby devices, depending on implementation. In one embodiment, the session handoff message 218 is implemented as an "NSUserActivity" message, which is a data structure defined by Apple UIKit/AppKit framework. In other embodiments, a custom data structure can be defined to wrap the virtual desktop session data for all platforms. The structure could be a key-pair table that contains an activity type as a mandatory item and other user-defined items of information. The activity type is the key identifier that can be checked to locate the right application, which is eligible to continue the activity. One possible implementation of the data structure used for the session handoff message 218 is shown in the table below:

TABLE 1

| Key | Value |
| --- | --- |
| JSESSIONID | A string ID |
| LaunchItemID | A string ID |
| BrokerAddress | A string value |

In the table above, JSESSIONID is a corresponding session identifier that is created and returned to the client device when the client device is used to log into the server with the correct user credentials. The JSESSIONID is returned to the client device so that the client does not need to be re-authenticated again the later process. JSESSIONID does not expire until the client device sends an explicit logout request to the server or until the session is timed out. Conventionally, the session identifier is saved within a client cookie in memory on the client device but when the client device restarts or initiates a new connection, the session identifier is gone and the client would need to re-authenticate with the server before starting a session. In various embodiments described herein, JSESSIONID is saved and passed to the receiver client to eliminate the need for the user to re-authenticate to the server during the session handoff process.

LaunchItemID identifies which desktop should be resumed during the session handoff process. In some embodiments, there could be more than one desktop that the user is entitled to access and LaunchItemID is used to indicate which of those desktops to resume when the session handoff message is accepted by the user. The BrokerAddress value specifies the server that the LaunchItemID belongs to.

Receiver Device

A virtual desktop client application installed on client device 204 acts as the receiver. In one embodiment, both the sender and receiver should be within a valid distance specified by the short-range communication protocol (BTLE) so that the devices can detect each other. After client device 204 receives the session handoff message 218 from sender device 200, it displays a notification to the end-user 202. In one embodiment, the session handoff process does not begin until the end user 202 confirm the notification.

When the end user 202 accepts the notification, the next step is to process the handoff message 218 so that the virtual desktop session could be resumed on the receiver device 204. Firstly, the activity data structure is checked and the values of each item are verified. Then receiver 204 can utilize a Uniform Resource Indicator (URI) handler feature to process the handoff request. The URI handler is a server-side program that enables client devices to connect to a remote virtual desktop session with a specified broker address, user identifier and launch item identifier using an Internet 220 connection. In various embodiments, the URI handler is extended with the functionality to support additional keywords so that the receiver client can build up a URI schema with all the necessary items. For example, the URI schema might be "vmware-view://brokeraddress/LaunchItemID?ZessionID=<id>". In various embodiments, the virtual desktop session information (e.g., JSESSIONID, LauchItemID, BrokerAddress), which was received by the receiver client device 204 from the sender device 200 as part of the session handoff process, can be passed by the receiver client device 204 to the URI handler on the server 206 in order to transfer the virtual desktop session.

In one embodiment, the URI request from the receiver client device triggers the handoff process by connecting to the virtual desktop session. The current session in original sender client device is terminated automatically once the desktop session is resumed on the receiver side successfully. When the receiver device connects to the virtual desktop, its role becomes a sender, which starts advertising a session handoff message with the data described in Table 1 shown above. The other devices, which are eligible to receive this activity, will become the receivers, which are entitled to grab the desktop session from the new sender.

Figure 3:
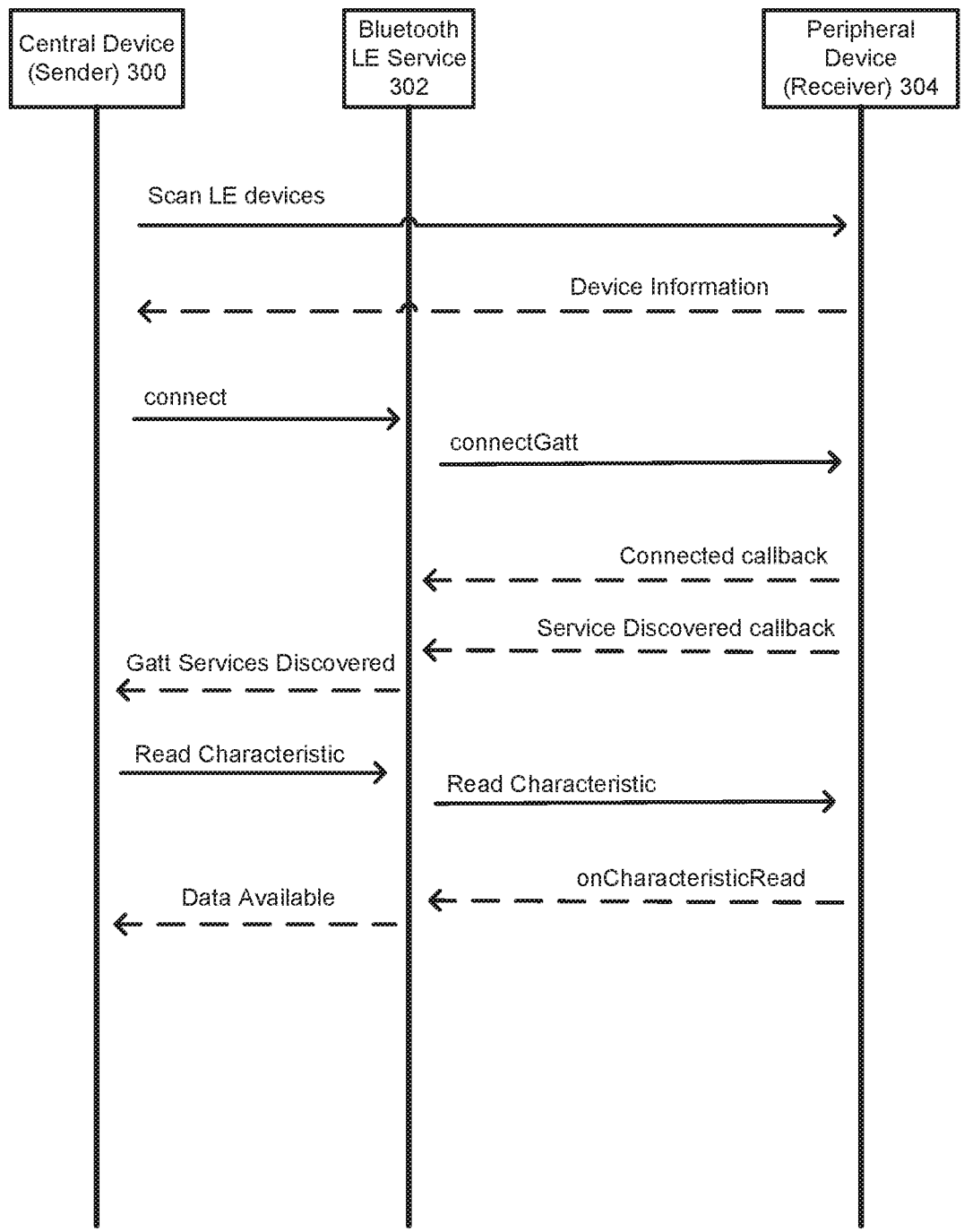
FIG. 3 illustrates an example of virtual desktop client connection continuity implemented using the BTLE protocol, in accordance with various embodiments.

FIG. 3 illustrates an example of virtual desktop client connection continuity implemented using the BTLE protocol, in accordance with various embodiments. Bluetooth Low Energy (LE) also called Bluetooth Smart or Version 4.0 is a short-range wireless communications technology that is intended to allow various mobile (and fixed) devices that are located within a valid distance of each other to communicate. BTLE is traditionally marketed at markets in the smart home, health and sport and fitness sectors, however it is not restricted to such fields. In one embodiment, the Application Programming Interface (API) support of BTLE can be utilized on each platform to develop a communication channel used to provide the virtual desktop client connection continuity. BTLE defines some key concepts discussed below that can be utilized to enable the implementation shown in FIG. 3.

Peripheral Role—A device in the "peripheral role" 304 can make the advertisement of the virtual desktop session. The peripheral device 304 acts as the initial sender device described above with reference to FIG. 2.

Central Role—A device in the "central role" 300 looks for the advertisement by scanning. The central device 300 acts as the receiver device described above with reference to FIG. 2.

Generic Attribute Profile (GATT)—The GATT profile is a general specification for sending and receiving short pieces of data known as "attributes" over a BTLE link. All current Low Energy application profiles are based on GATT.

Characteristic/Descriptor—A characteristic contains a single value. A descriptor specifies a human-readable description for a characteristic's value.

Service—A service is a collection of characteristics, which holds all the key/values of an activity.

The process illustrated in FIG. 3 may comprise the following sequence of communications between the elements of BTLE mentioned above.

1. The interaction begins when the central device 300 acting as the receiver begins scanning nearby other BTLE devices whenever the virtual desktop client application is launched on the central device 300. In response, the peripheral device 304 may provide device information to the central device 300.
2. The central device 300 (receiver) sends its device address to the BTLE Service 302 to connect the GATT peripheral after validating the pre-defined name (virtual desktop client) of the device information.
3. The BTLE service 302 sends intent GATT SERVICES DISCOVERED to notify the central device 300 (receiver) to enumerate the GATT services of the peripheral device 304 (sender) after the receiver and sender are connected.
4. A readable characteristic containing session handoff data (e.g. NSUserActivity) is read by the central device 300 (receiver) from one of the services.
5. With the session information (e.g. JSESSIONID, brokeraddress, etc.) decrypted from activity, the virtual desktop client application on the central device would create a system notification indicating that a desktop session from nearby devices is ready for handoff.
6. User could grab the desktop session by confirming the notification displayed on the central device 300. After successful handoff, the central device 300 switches its role to sender (i.e., to a peripheral device).
7. The original peripheral device 304 switches its role to receiver (i.e. central device) to be ready for the desktop session to be handed back again.

Security

Considering BTLE allows the data to be transported over the connection channel without any encryption, the continuity process can establish a secure communication between the sender client device and receiver client device to protect the data. One widely deployed method adopted to transmit data between 2 peers is SSL/TLS. However, it requires a Public Key Infrastructure (PKI) in place, which may expensive to maintain. Further, using SSL/TLS is subject to man-in-the-middle (MITM) attacks (i.e. faking as a non-trusted peer). Moreover, in certain situations, the sender and receiver devices may be under management from the mobile device management (MDM) perspective. Otherwise, the communication should be forbidden to prevent the data from being revealed to unexpected device or users.

Based on these concerns, one possible security solution is applying J-PAKE protocol to establish a private and authenticated data transmission channel over BTLE between two peers based on a shared password which will be a token pushed down to the devices by a server (e.g. MDM server) periodically. J-PAKE protocol aims to bootstrap a high-entropy cryptographic key that is usually used as the communication session key from a low-entropy secret, which is the shared token. Despite J-PAKE already having provided the forward secrecy, a periodical renewal of the token is still needed to allow the administrator to enable or disable the continuity function on the target devices.

Handshake phase after the receiver client device connects to the sender client device based on J-PAKE protocol can be described as follows. The sender and receiver will first send each other a random key; and they send second key computed based on the first key received and the shared token. At last, they can compute the final key based on the key received at the second time. This final key is used for symmetric data encryption or decryption for communications between the sender device and the receiver device.

Figure 4:
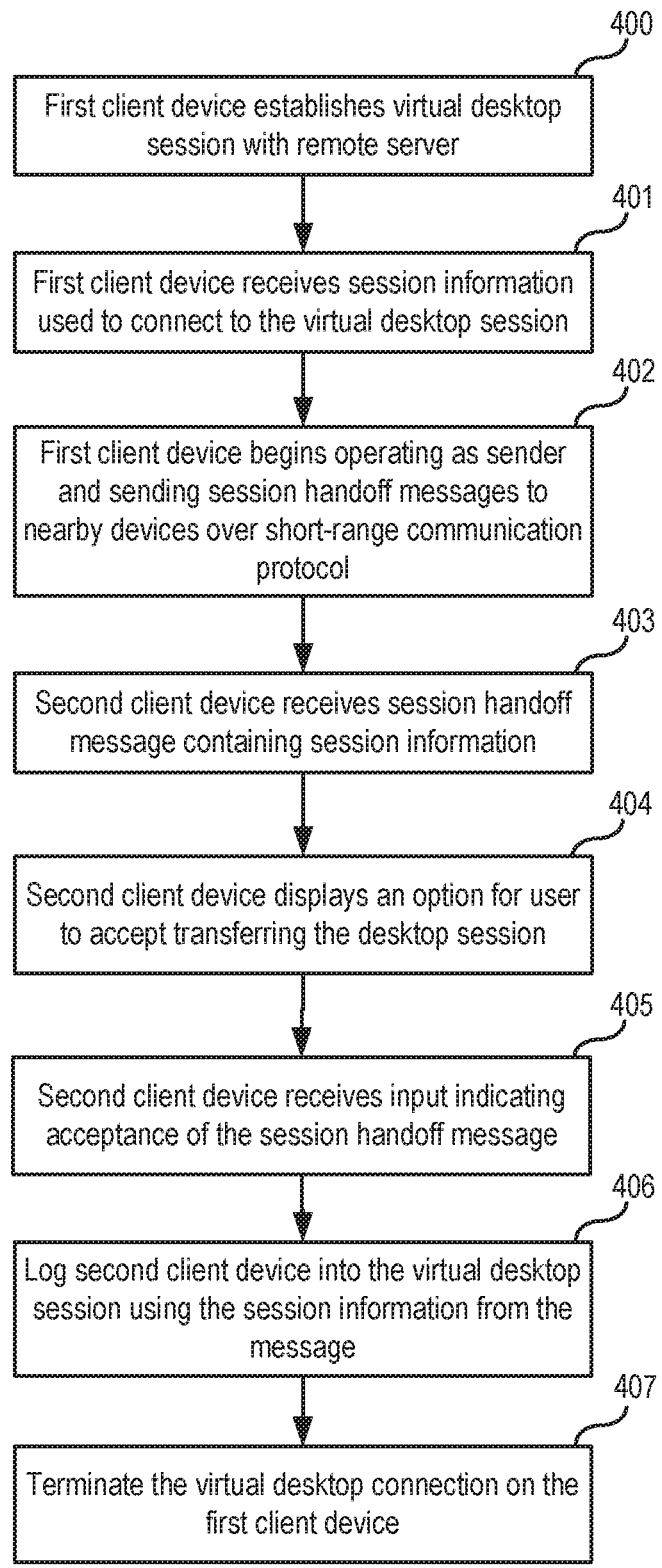
FIG. 4 illustrates an example of a process for providing virtual desktop connection continuity, in accordance with various embodiments.

FIG. 4 illustrates an example of a process for providing virtual desktop connection continuity, in accordance with various embodiments. As shown in operation 400, a first client device establishes a virtual desktop session with a remote server. In response to establishing the session, the first client device receives certain session information (including a session identifier) from the server, which can be stored on the first client device, as shown in operation 401.

In operation 402, the first client device begins operating as a sender device. When operating as a sender, the first client device broadcasts session handoff messages to nearby devices using a short-range communications protocol. In some embodiments, only nearby devices having a virtual desktop client application launched thereon may be acting as receivers. Moreover, only client devices that have the same user cloud account or having a shared trusted key with the sender devices may act as an eligible receiver.

In operation 403, a second client device receives the session handoff message from the first client device. The session handoff message contains session information of the virtual desktop session established on the first client device. In operation 404, the second client device displays an option for the user to accept transferring the desktop session. In operation 405, the second client device may receive user input, indicating acceptance of the session handoff message and the session handoff process begins. In operation 406, the second client device uses the session information received from the first client device to log into the virtual desktop session. In one embodiment, the second client device invokes a URI handler of the server and passes the session information as part of the URI passed to the handler.

In operation 407, after the virtual desktop session has been successfully transferred to the second client device, the virtual desktop connection can be terminated on the first client device. Once the connection has been terminated, the first client device may begin operating as a the new receiver and the second client device may begin operating as the new sender.

Figure 5:
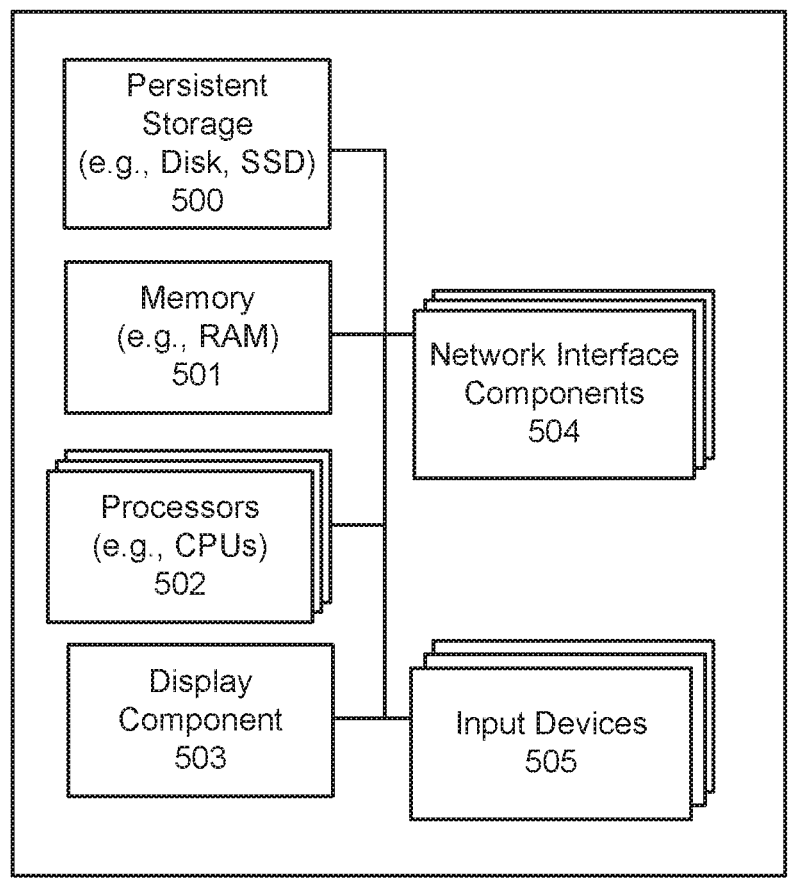
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for providing virtual desktop client connection continuity, the method comprising:
    receiving a session handoff message transmitted from a first client device to a second client device over a short-range wireless connectivity protocol, the first client device operating in sender mode and having a virtual desktop session established with a virtual desktop executing on a remote server, the second client device operating in receiver mode;
    establishing a private authenticated transmission channel between the first client device and the second client device based on a shared token periodically sent from a server to the first client device and the second client device, wherein the private authenticated transmission channel is established by:
        exchanging a random key between the first client device and the second client device;
        computing a second key based on the random key and the shared token periodically sent from the server;
        exchanging the second key between the first client device and the second client device; and
        computing a final encryption key based on the second key, the final encryption key used to secure communication on the private authenticated transmission channel;
    receiving session information used to maintain the virtual desktop session from the first client device to the second client device over the private authenticated transmission channel;
    displaying to a user of the second client device, an option for transferring the virtual desktop session from the first client device to the second client device;
    receiving, on the second client device, input indicating acceptance of the session handoff message; and
    in response to said input, initiating a session handoff process to log the second client device into the virtual desktop using the session information received from the first client device, wherein the session handoff process is completed without requesting authentication information from the user; and
    disconnecting the virtual desktop session on the first client device in response to completing the session handoff process.

2. The method of claim 1, wherein the session handoff process further comprises:
    invoking a Uniform Resource Identifier (URI) handler on the server by the second client device by passing the session information to the URI handler.

3. The method of claim 1, wherein the session information is stored in a data structure that comprises:
    a session identifier that identifies the virtual desktop session; and
    a server address that identifies the server hosting the virtual desktop.

4. The method of claim 1, wherein the short-range communications protocol is Bluetooth Low Energy (BTLE), wherein the first client device operates in a peripheral role of BTLE and wherein the second client device operates in a central role of BTLE.

5. The method of claim 1, wherein receiving the session handoff message further comprises:
    verifying that the first client device and the second client device are associated with the user's account or share a trusted key.

6. A computing system, comprising:
    at least one processor; and
    memory including instructions that, when executed by the at least one processor, cause the computing system to perform the steps of:
        receiving a session handoff message transmitted from a first client device to a second client device over a short-range wireless connectivity protocol, the first client device operating in sender mode and having a virtual desktop session established with a virtual desktop executing on a remote server, the second client device operating in receiver mode;
        establishing a private authenticated transmission channel between the first client device and the second client device based on a shared token periodically sent from a server to the first client device and the second client device, wherein the private authenticated transmission channel is established by:
            exchanging a random key between the first client device and the second client device;
            computing a second key based on the random key and the shared token periodically sent from the server;
            exchanging the second key between the first client device and the second client device; and
            computing a final encryption key based on the second key, the final encryption key used to secure communication on the private authenticated transmission channel;
        receiving session information used to maintain the virtual desktop session from the first client device to the second client device over the private authenticated transmission channel;
        displaying to a user of the second client device, an option for transferring the virtual desktop session from the first client device to the second client device;
        receiving, on the second client device, input indicating acceptance of the session handoff message; and
        in response to said input, initiating a session handoff process to log the second client device into the virtual desktop using the session information received from the first client device, wherein the session handoff process is completed without requesting authentication information from the user; and
        disconnecting the virtual desktop session on the first client device in response to completing the session handoff process.

7. The computing system of claim 6, wherein the session handoff process further comprises:
    invoking a Uniform Resource Identifier (URI) handler on the server by the second client device by passing the session information to the URI handler.

8. The computing system of claim 6, wherein the session information is stored in a data structure that comprises:
    a session identifier that identifies the virtual desktop session; and a server address that identifies the server hosting the virtual desktop.

9. The computing system of claim 6, wherein the short-range communications protocol is Bluetooth Low Energy (BTLE), wherein the first client device operates in a peripheral role of BTLE and wherein the second client device operates in a central role of BTLE.

10. The computing system of claim 6, wherein receiving the session handoff message further comprises:
verifying that the first client device and the second client device are associated with the user's account or share a trusted key.

11. A non-transitory computer readable storage medium comprising one or more sequences of instructions, the instructions when executed by one or more processors causing the one or more processors to execute the operations of:
receiving a session handoff message transmitted from a first client device to a second client device over a short-range wireless connectivity protocol, the first client device operating in sender mode and having a virtual desktop session established with a virtual desktop executing on a remote server, the second client device operating in receiver mode;
establishing a private authenticated transmission channel between the first client device and the second client device based on a shared token periodically sent from a server to the first client device and the second client device, wherein the private authenticated transmission channel is established by:
exchanging a random key between the first client device and the second client device;
computing a second key based on the random key and the shared token periodically sent from the server;
exchanging the second key between the first client device and the second client device; and
computing a final encryption key based on the second key, the final encryption key used to secure communication on the private authenticated transmission channel;
receiving session information used to maintain the virtual desktop session from the first client device to the second client device over the private authenticated transmission channel;
displaying to a user of the second client device, an option for transferring the virtual desktop session from the first client device to the second client device;
receiving, on the second client device, input indicating acceptance of the session handoff message; and
in response to said input, initiating a session handoff process to log the second client device into the virtual desktop using the session information received from the first client device, wherein the session handoff process is completed without requesting authentication information from the user; and
disconnecting the virtual desktop session on the first client device in response to completing the session handoff process.

12. The non-transitory computer readable storage medium of claim 11, wherein the session handoff process further comprises:
invoking a Uniform Resource Identifier (URI) handler on the server by the second client device by passing the session information to the URI handler.

13. The non-transitory computer readable storage medium of claim 11, wherein the session information is stored in a data structure that comprises:
a session identifier that identifies the virtual desktop session; and
a server address that identifies the server hosting the virtual desktop.

14. The non-transitory computer readable storage medium of claim 11, wherein receiving the session handoff message further comprises:
verifying that the first client device and the second client device are associated with the user's account or share a trusted key.

\* \* \* \* \*